Oct. 14, 1958     S. GRUENWALD     2,855,673

DENTAL INSTRUMENT AND METHOD OF PREPARING TEETH

Filed Dec. 1, 1955

INVENTOR,
SIEGFRIED GRUENWALD
BY Weatherford & Weatherford
attys

United States Patent Office 2,855,673
Patented Oct. 14, 1958

2,855,673

DENTAL INSTRUMENT AND METHOD OF PREPARING TEETH

Siegfried Gruenwald, Memphis, Tenn.

Application December 1, 1955, Serial No. 550,259

4 Claims. (Cl. 32—59)

This invention relates to dental instruments for use in the grinding of teeth, particularly for such applications wherein it is necessary to uniformly grind the surfaces of the tooth, as in the preparation of the tooth for the application of a jacket crown thereon. It further relates to a novel method of jacket crown preparation.

In the preparation of a tooth for a jacket crown the enamel must be removed from the labial (outer) and lingual (inner) surfaces of the tooth to a uniformly tapered depth so that the jacket crown may be fitted thereon. It is essential that this reduction be uniform so that the porcelain jacket crown when formed to the original shape of the tooth will be of a uniformly graduated thickness, which will insure better strength and color. Heretofore such reduction has been a time consuming task requiring guesswork on the part of the dentist as to when the tooth had been sufficiently and uniformly reduced.

It is contemplated in the present invention that a set of dental instruments be provided comprising a pair of complementarily formed grinding instruments, which obviates the guesswork previously required in grinding a tooth to a uniform depth.

It is further contemplated that a novel method of preparing a tooth for a jacket crown be provided.

The principal object of the present invention is to provide a novel set of dental instruments for the uniform reduction of the tooth enamel.

A further object of the invention is to provide such a set comprising a guide-forming instrument and a surface-reduction instrument, said guide-forming instrument having a narrow grinding edge and a cylindrical shoulder of lesser diameter, and said surface-reduction instrument having an elongated frusto-conical grinding surface and a cylindrical shoulder of lesser diameter, the distances of the shoulders of said instruments from the respective grinding surfaces thereof being equal.

A further object of the invention is to provide a new and novel method of preparing a tooth for a jacket crown.

A further object is generally to improve the design and construction of dental grinding instruments.

The means by which the foregoing and other objects of the present invention are accomplished and the manner of their accomplishment will be readily understood from the following specification upon reference to the accompanying drawings, in which.

Figure 1:
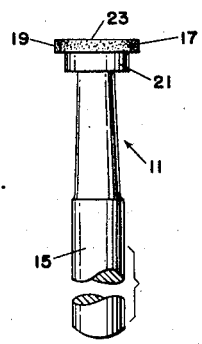
Fig. 1 is a side elevational view of the guide-forming instrument of the present invention.
Figure 2:
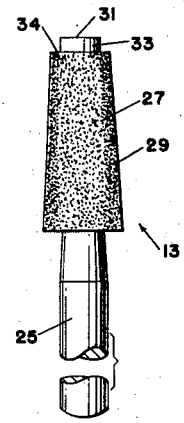
Fig. 2 is a side elevational view of the surface reduction instrument of the present invention.

Referring now to the drawings in which the various parts are indicated by numerals, the set of dental grinding instruments of the present invention comprises in general a guide-forming instrument 11, best shown in Fig. 1, and a surface-reduction instrument 13, best shown in Fig. 2, the size of the instruments in these figures being exaggerated for purposes of illustration.

Guide-forming instrument 11 includes a shaft 15, one end of which is adapted to be carried by a conventional power operated dental instrument holder, not shown, for the rotation of the guide-forming instrument. A grinding portion, preferably in the form of a grinding disc 17, is rigidly mounted on the other end of shaft 15, with the shaft disposed axially thereof. Grinding disc 17 is provided with an abrasive edge 19, which may be formed by any suitable abrasive material, but preferably by providing the edge with a diamond coating. A cylindrical non-abrasive shoulder 21 is rigidly mounted on shaft 15 with the shaft disposed axially thereof. Cylindrical shoulder 21 is preferably disposed adjacent disc 17 on the side of the disc which is remote from the distal end 23 of shaft 15. The diameter of cylindrical shoulder 21 is preferably greater than the diameter of the portion of shaft 15 adjacent the shoulder, but less than the diameter of disc 17. Shaft 15, disc 17 and shoulder 21 are preferably, though not necessarily, integrally formed, with distal end 23 being flush with the outer face of disc 17.

Surface-reduction instrument 13 includes a shaft 25, one end of which is adapted to be carried by a conventional power operated dental instrument holder, not shown, for the rotation of the surface-reduction instrument. A grinding portion, which is preferably an elongated frusto-conical grinding portion 27, is rigidly mounted on shaft 25 with the shaft extending axially thereof. Frusto-conical grinding portion 27 is provided with an abrasive peripheral face 29 which may be formed from any suitable abrasive material, as for example by diamond-coating the peripheral face of the grinding portion 27. Frusto-conical grinding portion 27 is preferably disposed on shaft 25 so that the end of frusto-conical portion 27, which is of smaller diameter, is adjacent the distal end 31 of shaft 25. Frusto-conical grinding portion 27 is elongated and preferably of a length which is greater than the longitudinal dimension of the tooth on which used. A smooth cylindrical non-abrasive shoulder 33 is rigidly mounted on shaft 25 adjacent the distal end 31, with the shaft disposed axially thereof. Shoulder 33 is disposed adjacent the outer end 34 of frusto-conical grinding portion 27, and is smaller in diameter than the outer end.

In the preferred embodiment the diameter of disc 17 is greater than the diameter of outer end 34, and the diameter of shoulder 21 is greater than the diameter of shoulder 33. The difference in diameters of shoulder 21 and disc 17 is equal to the difference in diameters of shoulder 33 and outer end 34. It will be better understood from the hereinafter described use of the set of instruments of the present invention that the foregoing relationship between the diameters characterizes an important feature of the present invention, which provides a novel and useful set of instruments with which a novel method for preparing a tooth for a jacket crown may be carried out.

Figure 3:
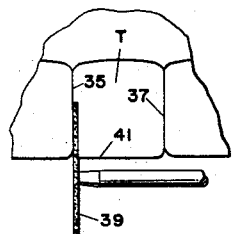
Fig. 3 illustrates diagrammatically, on a reduced scale, the first step in the method of the present invention for the preparation of a tooth for a jacket crown.

Referring now particularly to Figs. 3 through 8 which illustrate the successive steps in carrying out the reduction of the tooth in accordance with the method of the present invention, the first step in the method is illustrated diagrammatically in Fig. 3. In this first step the distal edge 35 and the mesial edge 37 of the tooth T which is to be prepared for a jacket crown are reduced to form converging reduced edges 35A and 37A. The reduction may be accomplished by means of a conventional dental cutting disc 39 which is slightly inclined towards the axial mid-line of tooth T during the reduction of the edges 35, 37, whereby the edges 35A, 37A converge towards the incisal edge 41 of the tooth.

Figure 4:
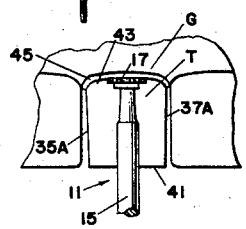
Fig. 4 illustrates diagrammatically, on a reduced scale, the use of the guide-forming instrument in the second step of such a method.
Figure 5:
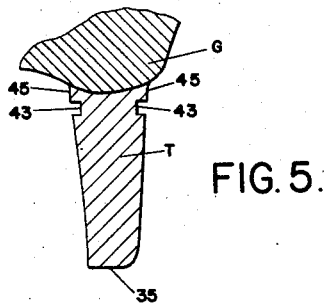
Fig. 5 is a diagrammatic cross-sectional view of the tooth (the root being omitted) on the scale of Fig. 2, illustrating the grooves formed in the tooth after the step of Fig. 4 has been accomplished.

The next step, which is illustrated in Figs. 4 and 5, is performed with guide-forming instrument 11. In this step a groove 43 is formed in the tooth T which extends from the reduced distal edge 35A to the reduced mesial edge 37A of the tooth. In forming groove 43, grinding disc 17 is closely spaced from gingiva G and the outline thereof is followed, whereby an arcuate shoulder 45 of substantially uniform width is formed between groove 43 and gingiva G. The grinding is continued until cylindrical shoulder 21 abuts the face of tooth T and limits the depth of groove 43, whereby the groove is formed of substantially constant depth which is equal to the difference in diameter between cylindrical shoulder 21 and disc 17. This procedure is followed on both the labial (outer) amd lingual (inner) surfaces of tooth T.

Figure 6:
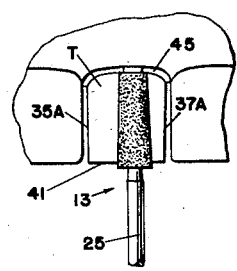
Fig. 6 is a diagrammatic view, on a reduced scale, illustrating the use of the surface reduction instrument in the third step of such a method.
Figure 7:
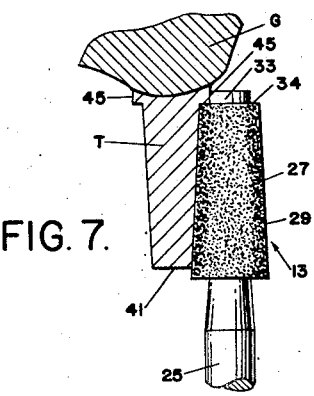
Fig. 7 is a diagrammatic cross-sectional view on the scale of Fig. 2 illustrating the tooth (the root being omitted) with surfaces prepared and with the surface reduction instrument shown in elevation.

Fig. 6 illustrates the third step in the preparation of the tooth for a jacket crown. In this step the labial and lingual surfaces of the tooth are reduced by means of the surface-reduction instrument 13. This is accomplished by moving the instrument 13, as it is rotated, laterally across the tooth T from edge to edge thereof with the longitudinal axis of the instrument being disposed parallel to the long axis of the tooth T. Surface-reduction instrument 13 is guided laterally across the tooth by engagement of the outer end 34 of frusto-conical grinding portion 27 with the upper wall of groove 43. It will be understood that the depth that tooth T is ground by instrument 13, will be limited by the abutment of cylindrical shoulder 33 with shoulder 45. Thus it will be seen that the depth ground by the portion of frusto-conical grinding portion 27 adjacent outer end 34 will be the saime as the depth of groove 43 since the difference in diameters of shoulder 21 and disc 17 is equal to the difference in diameter of shoulder 33 and outer end 34. Also it will be understood that the reduced portion will taper towards the incisal edge 41 of the tooth, since during the reduction the surface-reduction instrument 13 is disposed with its axis parallel to the longitudinal axis of the tooth which will cause the peripheral face 29 to be inclined with respect to the surface of the tooth and thereby provide the tapering thereof.

It will be understood from the foregoing description of the use of instruments 11, 13 that means is provided for grinding a tooth to a uniformly tapered depth with rapidity and accuracy. Also it will be understood that it is not intended that the present invention be limited to the frustoconical shape of the grinding portion 27, but that the grinding portion may be formed in other shapes, as for example, a cylindrical shape whereby the tooth may be ground to a constant depth rather than a tapered depth.

Figure 8:
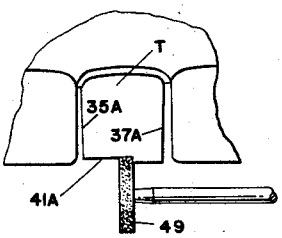
Fig. 8 illustrates diagrammatically the final step in such a method.

The final step for the preparation of the tooth consists in reducing the incisal edge 41 of the tooth as by means of a conventional diamond wheel 49, this step being best illustrated in Fig. 8. The reduction is made so that the incisal bevel of the reduced incisal edge 41A will be at right angles to the masticatory force of the opposing tooth.

From the foregoing description it is apparent that a novel set of dental instruments is provided for carrying out the novel method of preparing a tooth for a jacket crown. By the practice of such method, using the instruments of the present invention, great accuracy and speed of tooth reduction is accomplished which has heretofore not been possible. A tooth prepared in accordance with the present invention will form the base for a finished tooth construction which will have good strength and color characteristics.

I claim:

1. A dental grinding instrument comprising a rotatable shaft having a distal end and an end adapted to be carried by rotating means, a narrow grinding disc rigidly mounted on said shaft with the shaft extending axially thereof, the distal end of said shaft terminating flush with the outer surface of said disc, said disc having an abrasive edge, a smooth cylindrical shoulder rigidly mounted on said shaft with the shaft extending axially thereof, said shoulder having one side thereof adjacent said disc on the inner surface of said disc remote from the distal end of said shaft, the diameter of said shoulder being slightly less than the diameter of said disc, and substantially in excess of the diameter of said shaft, the periphery of said shoulder being inset a minor distance from the periphery of said abrasive edge less than the thickness of a tooth to be ground and defining a groove grinding area of shallow depth.

2. A method of preparing a tooth for a jacket crown comprising the steps of reducing the distal and mesial edges of the tooth to form converging edges, grinding a narrow groove in each of the labial and lingual surfaces of said tooth of a substantially constant depth adjacent and spaced from the gingiva at a substantially uniform distance whereby a shoulder is formed between said groove and the gingiva, said surfaces of said tooth beyond said grooves remote from said gingiva being undisturbed, subsequently while using said shoulder and said groove as a guide reducing the labial and lingual surfaces of the tooth, the portion of said surfaces adjacent said shoulder being reduced to the same depth of said groove with the remainder of said surfaces reduced so as to taper the tooth from the portion adjacent said shoulder towards the incisal edge of the tooth, and reducing the incisal edge so that the reduced incisal edge is at a right angle to the masticatory force of the opposing tooth.

3. A method of preparing a tooth for a jacket crown comprising the steps of reducing the distal and mesial edges of the tooth to form converging edges, grinding a narrow groove in each of the labial and lingual surfaces of the tooth adjacent and spaced from the gingiva whereby a shoulder is formed between said groove and the gingiva, said surfaces of said tooth beyond said grooves remote from said gingiva being undisturbed, subsequently while using said shoulder and said groove as a guide substantially uniformly reducing the labial and lingual surfaces of the tooth, and reducing the incisal edge so that the incisal edge is at a right angle to the masticatory force of the opposing tooth.

4. A method of preparing a tooth for a jacket crown comprising the steps of reducing the distal and mesial edges of the tooth, grinding a narrow groove in each of labial and lingual surfaces of said tooth adjacent and spaced from the gingiva whereby a shoulder is formed between said groove and the gingiva, said surfaces of said tooth beyond said grooves remote from said gingiva being undisturbed, subsequently while using said shoulder and said groove as a guide substantially uniformly reducing the labial and lingual surfaces of the tooth, and reducing the incisal edge of the tooth.

References Cited in the file of this patent

UNITED STATES PATENTS

| | | |
|---|---|---|
| 1,907,319 | Engelfried | May 2, 1933 |
| 2,735,181 | Carpenter | Feb. 21, 1956 |